March 28, 1961  L. C. POUNDS  2,977,272
LAMINATED ARTICLES
Filed June 12, 1957

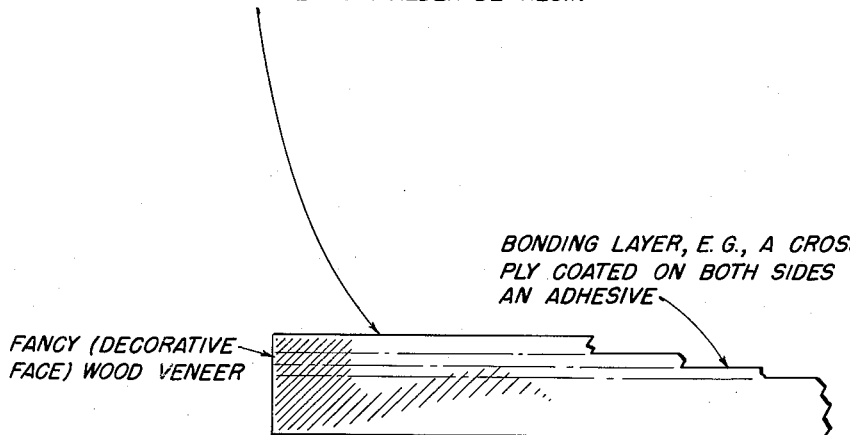

Fig.1.

BASE WHEREIN AT LEAST THE FACE SURFACE IS OF WOOD AND HAVING A THICKNESS OF AT LEAST 1/16 INCH

TRANSPARENT OVERLAY SHEET OF PAPER WHICH HAS BEEN PRE-IMPREGNATED WITH FROM 2-15% BY WEIGHT THEREOF OF A THERMOSETTING RESIN, E.G., DIALLYL PHTHALATE, WITH OR WITHOUT A WETTING AGENT; AND THE DRIED, PRE-IMPREGNATED PAPER THEN BEING IMPREGNATED WITH AN ALKYD RESIN-MODIFIED BENZOGUANAMINE-FORMALDEHYDE RESIN

BONDING LAYER, E.G., A CROSSBAND PLY COATED ON BOTH SIDES WITH AN ADHESIVE

FANCY (DECORATIVE FACE) WOOD VENEER

Fig.2.

BASE, E.G., A LAMINATED CORE, A PARTICLE BOARD, ETC., HAVING A THICKNESS OF AT LEAST 1/16 INCH

*INVENTOR.*
LEWIS C. POUNDS.
BY
Harold L. Kauffman
*ATTORNEY.*

United States Patent Office 2,977,272
Patented Mar. 28, 1961

2,977,272
LAMINATED ARTICLES

Lewis C. Pounds, Riverside, Conn., assignor to American Cyanamid Company, New York, N.Y., a corporation of Maine Filed June 12, 1957, Ser. No. 665,308

8 Claims. (Cl. 154—132)

This invention relates broadly to articles of manufacture or structures, and especially to laminated articles comprising a base member wherein at least the face surface is of wood (artificial or natural wood), and a particular kind of resin-impregnated overlay sheet of paper laminated to the said base member. The scope of the invention includes both method and article features.

In the article and method features of this invention the aforesaid overlay sheet is directly bonded to the base member having a surface face of wood, which usually is decorative or aesthetic in character. The base member has a thickness of at least 1/16 inch, e.g., from 1/8 to about 1 inch, or in some cases as much as 2 inches, this thickness being correlated with the density of the said base member whereby the latter is adapted to retain its normal form under moderate stress. The minimum thickness of the base member, correlated with the density thereof as has just been described, is critical in carrying the present invention into effect. The maximum thickness of the base member is governed by practical considerations, e.g., availability, cost, where and how the article is to be used, etc. A base member which is especially suitable for use in practicing the present invention is one having a decorative face veneer of natural wood united thereto.

The present invention is separate and distinct from that disclosed and claimed in the copending application of Richard Lindenfelser and Martha K. Layman (nee Martha K. Kilthau), Serial No. 651,629, filed April 9, 1957, as a continuation-in-part of their application Serial No. 312,218, filed September 30, 1952, and now abandoned. The invention claimed in the present application is a different solution to the problem of producing new and improved decorative structures including laminated articles that are useful in horizontal applications (or so-called "working surfaces") and those that can be employed in vertical applications, e.g., wall paneling and the like.

As stated in the aforementioned Lindenfelser et al. copending application Serial No. 651,629, the conventional high-pressure laminates, which heretofore have been used in horizontal surface applications such as table tops, restaurant counter tops, bar tops, etc., are usually composed of a laminated core, a print sheet and an overlay sheet. In such laminated articles the core is conventionally built up of a number of plies of paper, specifically kraft paper, which has been impregnated with a phenolic resin, assembled and consolidated under heat and pressure. The function of the core is to impart rigidity to the structure, using a minimum amount of core material, and to do this at the lowest possible cost. These objectives are generally attained by using a low-cost kraft paper, a low-cost phenolic resin and the lowest possible amount of phenolic resin as an impregnant for the kraft paper. The print sheet supplies the decorative effect to the laminate and, in preparing the assembly for lamination, is placed on top of the sheets constituting the core. The print sheet is generally composed of pure alpha-cellulose paper, absorbent regenerated cellulose paper, etc., on which either has been printed a design or which has been dyed or pigmented to give a solid color to the paper. The printed designs have unlimited range of form or artistic effect so long as the inks that are used are non-bleeding in the resin solution. The print sheet also is treated with a resin, generally heretofore with a melamine-formaldehyde resin. Insofar as the print sheet is concerned, the most important properties are good appearance and durability. Such properties can be obtained by the use of a melamine-formaldehyde resin, which is capable of imparting hardness, abrasion-resistance, solvent-resistance, and color-stability to the print sheet.

Because of the excessive wear to which horizontal surfaces are generally subjected, it has been the general practice heretofore to impart greater durability to the aforedescribed laminate by applying an overlay sheet over the print sheet. The overlay sheet usually consists of a single sheet of paper, generally alpha-cellulose paper, treated with a melamine-formaldehyde resin. The primary objectives in the use of the overlay sheet are to impart durability to the print sheet without detracting from its appearance. The melamine resins have been widely used as impregnants for the overlay sheet because of their aforementioned desirable properties and, when thus employed, are present therein in a very substantial amount. The resin content of the overlay sheet is customarily about 60% to 70% of the weight of the treated sheet as compared with a conventional resin content of about 50% in the print sheet and a resin content of about 33% to 35% in the core sheets. Although the overlay sheet greatly increases the durability of the laminate, the cellulose contributes a small amount of haze and, as a result, it is necessary to use a relatively thin sheet of alpha-cellulose paper as the overlay sheet. (The overlay paper is customarily about 2 to 4½ or 5 mils in thickness as compared with a thickness of about 8 mils for the print sheet and thicknesses of about 8–12 mils for the individual core sheets.) The fiber of the paper also may adversely affect the resistance of the surface to staining.

Vertical panels are frequently made by applying a resin-impregnated print sheet to a base material other than the laminated core structure described briefly above when discussing laminated articles commonly employed in horizontal applications. Base materials that are used in vertical panels or structures include Masonite wall board, asbestos cement board, wood waste board, plywood, etc., these relatively inexpensive materials being employed in order to keep costs at a minimum. Such base materials have a considerably lower density than laminated cores formed of, for example, kraft paper impregnated with a phenolic resin. As a result, they undergo considerably greater fluctuation of dimensions with changes in temperature and humidity than do the aforementioned laminated cores. Consequently the resin-impregnated print sheet (surface sheet bearing the decorative design) that is applied to such base materials is placed under considerable stress. Many resins, e.g., melamine-formaldehyde resins, are characterized by their high degree of inflexibility, and hence, in structures of the kind just described, print sheets containing such resins generally craze on aging and/or cause warping of the panel or structure. Attempts previously have been made to employ a print sheet containing a melamine-formaldehyde resin in vertical panels with the aid of several, intermediate, phenolic resin-treated core sheets which were assembled between the print sheet and the wall board or other base material.

In the structures known in the art and wherein a melamine-resin laminate is used in combination with a core, the said laminate has to be made separately and is then bonded to the core; and, if the core is of inadequate thickness, the assembly must be balanced. Alternatively, a melamine resin-treated print sheet can be bonded to a high density core in one operation if several phenolic resin-treated sheets are interposed between the print sheet and the core and if the assembly is balanced. Structures produced in these ways are expensive and time-consuming to make.

The invention disclosed and claimed in the aforementioned Lindenfelser et al. copending application Serial No. 651,629 provided a solution to the above-described problems heretofore encountered in constructing decorative vertical panels due, for one reason, to the fact that the resinous compositions used in practicing the invention have, in cured state, considerably greater flexibility than cured melamine-formaldehyde resins; and, therefore, make it possible to apply a single resin-impregnated print sheet to a structural board such as Masonite board, asbestos cement board and others of the kind aforementioned, thereby to obtain a decorative surface which is characterized by its excellent stability on aging, including resistance to crazing. Additionally, the aforesaid invention of Lindenfelser et al. makes it possible to bond (as by the simultaneous application of heat and pressure) a resin-impregnated print sheet directly to a base member having the minimum thickness hereinbefore set forth, with a single balance sheet or no balance sheet (with overlay of, for example, 2 to 5 mils thick).

With further reference to the differences between the decorative structures involved in the present invention and those disclosed and claimed in the aforementioned Lindenfelser et al. application Serial No. 651,629, it may be stated that the present invention is concerned with the surfacing of a base member wherein at least the face surface is of wood, using a single overlay sheet of a particular kind, this sheet being transparent in the finished article.

Many decorative wood panels or structures now commercially available are inherently attractive; consequently, it is undesirable to cover such panels with a print paper. Fancy wood veneer-faced boards are examples of such decorative structures. However, there are very few wood-surfaced structures that can withstand pressures of (or much above) 300 p.s.i. without material deterioration. Since laminating syrups of the melamine-resin type generally require much higher pressures, e.g., from 500 to 1100 p.s.i., they cannot be used in laminating overlay (or other sheets) to wood-surfaced articles.

Prior to my invention, no wholly satisfactory resin-impregnated (resin-coated and -impregnated) overlay sheet was, to the best of my knowledge and belief, known per se or for the aforementioned purpose. My invention makes possible the decorative surfacing of low-density wood products (including wood-surfaced articles) so as to impart to such products surface properties of the general order of melamine-resin laminates, but with better craze-resistance and dimensional stability; also, improved transparency and elimination of water-spotting tendencies, due to the particular combination of resins in the overlay sheet and the manner in which they are incorporated therein.

The most widely used finish, prior to this invention, for covering decorative woods or wood surfaces has been a finish of baked enamel (low-bake furniture finish). Such a composition usually comprises an alkyd resin modified with a urea- or melamine-aldehyde resin. The finish is applied by spraying or by roll-coating a solution of clear or pigmented resin directly onto the wood or wood-surfaced article and then baking to effect solvent release and cure. No pressure is required. A coating device and a baking oven are the only equipment necessary. Although this finish is relatively inexpensive to apply, the product has poor wearability and inferior resistance to solvents and chemical stains.

It is an object of the present invention to produce articles of manufacture, specifically decorative laminates, wherein a transparent, resin-impregnated overlay sheet having a craze-resistant surface is superimposed directly upon a base member having at least its face surface of wood.

Another object of the invention is to produce a heat- and pressure-consolidated laminate having a hard, craze-resistant surface on a base having a wood-veneer surface or on a base composed wholly of wood, especially those which have decorative or aesthetic appeal.

It is a further object of the present invention to provide laminated articles with surfaces which are light-colored and light-stable, are resistant to heat, solvents and abrasion, and which also have a high gloss, good durability and a smooth surface.

Other objects of the invention will be apparent to those skilled in the art from the following more detailed description and from Figs. 1 and 2 of the accompanying drawing which are side elevations, partly broken, that illustrate articles or structures comprising preferred embodiments of the invention.

The foregoing and other objects are attained by the use of a resin-impregnated overlay sheet of paper. This paper is one which has been pre-impregnated with an impregnant comprising from 2% to about 15%, by weight of the dry pre-impregnated paper, of a thermosetting (or potentially thermosetting) resin, i.e., diallyl phthalate, with or without a non-ionic wetting agent. Thereafter, the pre-impregnated paper in dry state is impregnated with a curable resinous composition comprising a compatible blend of (A) an uncured resinous product of reaction of ingredients consisting essentially of formaldehyde and benzoguanamine in a molar ratio of from about 1:1 to about 4:1 and (B) from about 10% to about 50%, preferably from about 10% to about 20%, based on the total weight of (A) and (B), of an alkyd resin which is compatible with the resin of (A).

By pre-impregnating the paper (e.g., rag or alpha-cellulose paper) with an impregnant comprising a thermosetting resin as described briefly above and more fully hereafter, it has surprisingly been found that an overlay having improved transparency and freedom from water-spotting is obtained. This is in marked contrast to the results obtained when a different paper (that is, one which has not been pre-impregnated with a thermosetting resin) is employed.

The resin-impregnated overlay sheet of paper used in practicing the present invention is generally from about 0.5 mil to about 5 mils in thickness, and generally has a resin content (total resin content) of from about 65% to about 90% by weight of the dry paper in its finally treated form.

*Overlay paper and treatment*

Various cellulosic overlay papers can be used, including the so-called rag overlay papers, the rayon overlay papers, and the alpha-cellulose overlay papers. Papers thicker than 5 mils can be employed but are not generally desirable because of a very considerable lessening of transparency as the paper thickness is increased above 5 mils.

In accordance with the present invention the chosen overlay paper is pre-impregnated with from 2% to about 15% by weight of the dry, "impregnated" paper (initially impregnated paper or pre-impregnated paper is here meant), of a "thermosetting" (including potentially thermosetting) resin. This thermosetting resin is different from the benzoguanamine-formaldehyde resin with which the dried, pre-impregnated paper is subsequently impregnated. Examples of such thermosetting resins that can be used include Homopolymers and copolymers of unsaturated triazines, examples of which are given in Kropa U.S. Patent No.

2,510,503, dated June 6, 1950, including triallyl and trimethallyl cyanurates.

Homopolymers and copolymers of polyallyl esters, e.g., diallyl phthalate, diallyl succinate and others disclosed in the aforementioned Kropa patent in column 5, line 54, through line 5 in column 7.

Urea-aldehyde resins, and specifically urea-formaldehyde resins.

Melamine-aldehyde resin, and specifically melamine-formaldehyde resins.

Urea-melamine-aldehyde resins, and specifically urea-melamine-formaldehyde resins.

Phenol-formaldehyde resins.

Copolymers of (1) unsaturated alkyd resins (that is, polyhydric alcohol-polycarboxylic acid condensation products containing a plurality of polymerizably reactive alpha, beta-enal groupings) with (2) at least one compound which is compatible and copolymerizable therewith and which contains a $CH_2=C<$ grouping, e.g., styrene, acrylonitrile, diallyl phthalate, etc. More specific examples of such copolymers and of the components of (1) and (2) used in their preparation are given in, for instance, Kropa U.S. Patents 2,443,736–2,443,741, and 2,485,294. A still more specific example is a copolymer of, by weight, about 60% diethylene glycol fumarate sebacate and about 40% of diallyl phthalate.

Other examples of thermosetting resins that can be used in pre-impregnating the overlay paper will be apparent to those skilled in the art from the foregoing illustrative examples. Preferably, the pre-impregnating resin is one that does not discolor the paper.

As has been indicated hereinbefore, the impregnant with which the overlay paper is pre-impregnated may comprise a thermosetting resin alone (numerous examples of which have been given hereinbefore) or with one or more other additives, e.g., a coloring agent such as a dye, or a wetting agent. The wetting agent may comprise from 0 to about 25 percent by weight of the dry "impregnated" paper ("impregnated" has the same meaning here as given above with reference to the resin content of the pre-impregnated paper). Preferably, a wetting agent is employed, and in an amount which is at least 2% and not more than about 25%, more particularly from about 3% or 4% to about 15% or 16%, by weight of the aforementioned dry, impregnated paper.

The wetting agent, if employed, is preferably a non-ionic wetting agent, although the use of anionic or cationic wetting agents under certain conditions is not precluded. Examples of non-ionic wetting agents that can be used are the saponines; condensation products of ethylene oxide with fatty acids, alcohols, esters, aldehydes, amines, etc., and condensation products of ethylene oxide with isocyclic hydroxyl compounds having as a substituent in the nucleus at least one hydrocarbon or acyclic radical of at least four carbon atoms. Particularly good results have been obtained with the last-named class of condensation products, among more specific examples of which are condensation products of from 3 to 15 moles of ethylene oxide with normal butyl phenol, tert.-octyl phenol, dodecyl phenol, diisobutyl phenol and other isocyclic hydroxyl compounds of the kind described above. The condensation product of tert.-octyl phenol with about 10 moles of ethylene oxide is a preferred species of the more specific examples just mentioned.

Reference is made to the "Encyclopedia of Surface-Active Agents" by J. P. Sisiey, translated from the French and revised by P. J. Wood, published by Chemical Publishing Co., Inc., New York, N.Y. (1952), for additional examples of non-ionic wetting agents (surfactants) that can be used. See this same publication, also, for examples of anionic and cationic surface-active agents.

The pre-impregnated overlay is prepared by, for example, passing the untreated paper one or more times through a solution of the thermosetting resin, with or without a wetting agent, followed by drying of the wet, impregnated paper. The concentration of ingredients in the solution and the procedure are adjusted so that the percentages in the dry, impregnated paper are within the aforementioned ranges. The content of resin solids in the solution is usually relatively low, e.g., from 2% to 30% by weight of the solution.

Any of the volatile solvents in which the resin (or both resin and wetting agent if the latter is used) can be dissolved and/or dispersed can be employed in making the liquid pre-impregnating composition. Examples of such solvents or diluents are acetone, ethanol, isopropanol, ethylene glycol monoethyl ether, liquid aromatic hydrocarbons (e.g., benzene, toluene, etc.), esters, mixtures of these and other liquid media, e.g., a mixture of 40% ethanol and 60% toluene by volume, and others such as those mentioned hereinafter with reference to solvent "cutting" of the alkyd resin-modified benzoguanamine-formaldehyde resin.

With certain polymerizable monomers that are normally liquids and which can be polymerized to solid state, e.g., diallyl phthalate and other diallyl esters, the solvent can sometimes be omitted if care be taken to control the "pick-up" so that an excessive amount of resin will not be taken up by the paper.

A typical example of procedure followed in the laboratory in pre-impregnating the overlay (also used in the examples which follow) is set forth below:

(1) A 20% solids solution of monomeric diallyl phthalate (5%) and a non-ionic wetting agent (15%), specifically a condensation product of tert.-octyl phenol with about 10 moles of ethylene oxide, is prepared, using acetone as the solvent. Any of the usual polymerization catalysts employed in vinyl-type polymerizations can be added in catalytic amounts if it is desired to accelerate the polymerization.

(2) Overlay paper (alpha-cellulose, Hurlbut 812 or its equivalent) is passed through this solution and thence into a small infrared dryer at the rate of 1.5 ft./min.

(3) The temperature in the drying chamber is regulated so as to remove all the volatile solvent from the wet, impregnated paper.

(4) The dried impregnated paper is collected on a take-up roll and is then ready for subsequent impregnation with the main laminating syrup.

The pre-impregnated overlay paper is impregnated for use in practicing this invention with a curable resinous composition comprising a compatible blend of a particular and critical range of proportions of a particular benzoguanamine-formaldehyde resin and an alkyd resin which is compatible therewith. These resins will now be described in more detail.

The benzoguanamine-formaldehyde resin

This resin is a particular uncured resinous product of reaction of ingredients consisting essentially of formaldehyde and benzoguanamine; that is to say, the formaldehyde and benzoguanamine are reacted in particular proportions, under particular conditions and to a particular degree, in producing the uncured, but curable, resinous reaction products which are modified with an alkyd resin and used in practicing the present invention. More particularly, the formaldehyde and benzoguanamine are employed in a molar ratio of about 1:1 to about 4:1 and are caused to react with each other at a suitable temperature, more particularly a temperature of from about 60° C. to about 200° C. The reaction can be effected over a wide pH range, e.g., under pH conditions ranging from about 4 to about 11, advantageously at a pH of from about 4 to about 9, and usually at a pH of from 6 to 8 or 9. The reaction is continued to the required end point, which can be determined by one of the two methods described below, and is such that the resin solution or syrup is stable upon aging, but the reaction is not continued beyond the point where the resin becomes insoluble.

By one method of determining the end point, the reaction between the formaldehyde and the benzoguanamine is continued to the point where the resulting condensation product, when dissolved in ethyl alcohol to form a 50% solution, gives a composition which is stable (as evidenced by the absence of any precipitate formation) at 20°–25° C. for at least 5 hours; but the reaction is not allowed to proceed beyond the point where the condensation product has a plasticity or flow of about 60 mils as determined by the "Cyanamid test method," which is conducted as follows:

A charge of fifty grams of the material at 20°–30° C. is placed in the center of the bottom platen of a molding press, both platens of which are at a temperature of 290°±2° F. and which are so shaped and grooved as to produce a flat molded disc with concentric ridges the first of which is 1½ inches from the center of the disc, and which are spaced ½ inch apart, and each of which is $\frac{1}{32}$ inch high, $\frac{1}{16}$ inch wide at the top and with the sides sloping inwardly toward the top at an angle of 30° from the perpendicular. The press is closed in 20 seconds and a force of 18 tons applied in 15 seconds and maintained during the cure time. At the end of the time required for cure, the piece is removed and cooled. The average measurement of the thickness taken in the ring about 2¼ inches from the center of the molded disc is recorded in mils as a measure of the plasticity.

By another, more specific and preferred method of determining the end point (so-called "blue tail" test), the reaction between the formaldehyde and the benzoguanamine is continued until a small amount of a finely ground sample of the solid resin (obtained by cooling a sample of the hot syrup) produces a definite blue haze at 25° C. in about 10–15 ml. of a 50–50 mixture, by weight, of ethanol and water. In making this test a few particles of the finely ground resin are dropped into a test tube containing about 10–15 ml. of the aforesaid ethanol-water mixture at 25° C. As the particles of resin settle to the bottom of the solution, a blue tail can be detected if the resin has reached the desired end point. (The blue tail should not be confused with "schlieren" lines resulting from the change of refractive index due to the solution of the resin in the alcohol.)

Referring further to the preparation of the benzoguanamine-formaldehyde resinous reaction product it may be stated that the formaldehyde reactant is preferably employed in the form of an aqueous solution but it also may be used in the form of a polymer or other compound engendering formaldehyde, for instance trioxane (by which is meant specifically 1,3,5-trioxane or alpha-trioxymethylene), etc. The combined molar ratios of formaldehyde to benzoguanamine will vary from about 1:1 to about 4:1, the preferred range being from about 1.5:1 to about 2.5:1.

The temperature of the reaction mass during the resin-forming condensation reaction should be sufficiently high to ensure dissolution of the initial reaction product in the solvent employed. This minimum temperature is about 60° C. The practical upper limit of the reaction temperature is the reflux temperature of the mass when the reaction is carried out at atmospheric pressure. If higher pressures are used, the temperature may be increased, but it should not be above about 200° C. The preferred temperature range is generally from about 80° C. to about 105° C.

The reaction is caused to proceed to the desired end point under the pH conditions described previously herein. A buffer may be used in order to maintain the reaction mass in the preferred pH range and for this purpose one may use, for example, sodium hydroxide, potassium hydroxide, ammonium hydroxide, sodium carbonate, sodium bicarbonate, potassium bicarbonate or other inorganic base; also organic bases, more particularly organic amines, e.g., diethylaminoethanol, triethanolamine and the like. In general, it is preferred to adjust the pH of the reaction mass with sodium hydroxide, triethylamine or triethanolamine.

The actual reaction time for the resin-forming condensation reaction will, of course, be dependent on various factors such as solids concentration, pH, temperature and the like, but it is generally held to from about 10 minutes to about 1½ hours.

The condensation reaction between the benzoguanamine and formaldehyde may be carried out in the absence of a solvent or diluent or, if desired, in the presence of such solvents or diluents as water or organic solvents including ketones, aldehydes, hydrocarbons, esters, ethers, dioxane, etc., which are inert to, or do not form undesirable reaction products with, the resin-forming ingredients and the resin formed. Mixtures of any number of the organic-type solvents or diluents may also be used. It is preferred to operate (that is, to effect the reaction) in the presence of water and to avoid the use of alcohols or other hydroxyl-containing solvents or diluents.

Upon completion of the condensation reaction the resin, which will generally be in the form of an aqueous slurry, can be dehydrated, for example, by a spray-drying operation, by kettle dehydration, with or without vacuum, or by drum-drying. If either of the two latter expedients are employed, the resulting friable solid is ground or pulverized. Kettle dehydration is preferred when a solution of the resin is desired, in which case the solvent is added to the molten resin. The alkyd resin then may be added or, if desired, it may be added later.

In order to prevent over-polymerization of the resin during the drying step, its pH should not be too low. It may not be necessary to adjust the pH if the condensation reaction was carried out at a pH above about 7, more particularly at a pH of from about 7 to about 11, but if the reaction was carried out in the pH range of from about 4 to less than about 7, it may be desirable to increase the pH to about 7 to 8.5 during drying.

In making the benzoguanamine-formaldehyde resinous reaction product all of the benzoguanamine and formaldehyde to be employed may be reacted initially or, if desired, a portion of the formaldehyde may be reacted initially with the benzoguanamine and the remaining added during a later stage of the process.

The above-described benzoguanamine-formaldehyde condensation product is blended in the proportions hereinbefore mentioned with an alkyd resin (advantageously an oil-modified alkyd resin) which is compatible therewith in order to produce the curable resinous compositions employed in the compositions with which the pre-impregnated overlay paper is impregnated.

The alkyd resin

In the preparation of the compositions herein involved, the alkyd resin utilized may be one which is oil-free or it may be what is commonly referred to as a short oil-modified alkyd resin, namely, one containing less than 25% oil based on the total weight of the alkyd resin; or a medium-oil alkyd which is defined as an alkyd resin that has been modified with from 25% to less than 50% of oil; or a long-oil alkyd which is generally defined as an alkyd resin that has been modified with from 50% to not more than 80% of oil. The alkyd resins employed as a modifier of the benzoguanamine-formaldehyde resin are those which are conventionally prepared by use of a polycarboxylic acid and a polyhydric alcohol in which the acid may be a saturated acid or an alpha-unsaturated acid, more particularly an alpha, beta-unsaturated acid, but preferably those which are saturated.

In the preparation of the alkyd resin, one may modify the resin by use of oils or oil acids of the drying, semi-drying or non-drying classes although it is preferred that the semi-drying or non-drying oils be used. There is little overall advantage to be derived from using exclusively the drying oils although they may be employed where, for example, color retention on baking is not as important as adhesion. If the amount of oil used to modify the alkyd resin be decreased, particularly when the range of proportions comes within the limits of those set forth above and defined as short-oil alkyd resins, the necessity for the use of a more polar solvent for the resin becomes more pronounced.

Saturated or unsaturated polycarboxylic acids may be used in making the alkyd resin. Amongst those saturated polycarboxylic acids which may be employed are malonic, succinic, glutaric, sebacic, adipic, pimelic, suberic, azelaic, tricarballylic, citric, tartaric and malic. Phthalic acid, isophthalic acid and terephthalic acid may also be used in the preparation of the alkyd resins in the same proportions as the saturated polycarboxylic acids. Additionally, one may use such unsaturated acids as maleic, fumaric, itaconic, mesaconic, citraconic and the like. These acids and other comparable acids, their esters and their available anhydrides may be used in the preparation of these alkyd resins. Obviously, these acids may be used either singly or in combination with one another.

In making the alkyd resin, the conventional polyhydric alcohols may be used, e.g., ethylene glycol, diethylene glycol, dipropylene glycol, tetramethylene glycol, pinacol, trimethylol propane, trimethylol ethane, mannitol, dulcitol, sorbitol, glycerol, pentaerythritol, dipentaerythritol and the like. The polyhydric alcohols may be used either singly or in combination with one another in the esterification reaction in the preparation of the alkyd resin.

In the esterification reaction between the polycarboxylic acid and the polyhydric alcohol in the formation of the alkyd resin, it is possible to use a polyhydric alcohol in equimolecular proportions with a polycarboxylic acid. There are instances, however, in which it is desired to use as much as 50% in excess of the amount of polyhydric alcohol of that theoretically required to esterify completely the polycarboxylic acid. The excess of alcohol in the reaction mixture is desirable in order to produce, in a reasonably short time, an esterification product of relatively low acid number.

In the preparation of the oil-modified alkyds, one may use such oils as castor oil, linseed oil, chaulmoogra oil, cherry kernel oil, corn oil, hemp seed oil, grape seed oil, hazel nut oil, candlenut oil, lard oil, soya bean oil, coconut oil, cottonseed oil, olive oil, peach kernel oil, peanut oil, pistachio nut oil, rape seed oil, and the like.

*The laminating composition*

The above-described benzoguanamine-formaldehyde condensation product and an alkyd resin of the kind mentioned above by way of example, and in the proportions previously set forth, are mixed together and dissolved in a suitable solvent or solvent mixture to form the laminating (impregnating) composition with which the pre-impregnated overlay paper is treated. The benzoguanamine-formaldehyde resinous reaction product may be blended with a single alkyd resin or with a plurality of different alkyd resins which are compatible therewith.

The blend of resins may be cut with a variety of solvents or diluents such, for example, as ethanol, isopropanol, butanol, esters, ketones, etc., or with mixtures of an alcohol and an aromatic hydrocarbon, or of a ketone and an aromatic hydrocarbon, for instance a mixture of 40% ethanol and 60% toluene by volume. The solvent is preferably a mixture of, by weight, from 10% to 90% of ethylene glycol monoethyl ether and from 90% to 10% of ethyl alcohol. Laminating compositions containing such a solvent mixture, as a solvent for the hereindescribed alkyd resin-modified benzoguanamine-formaldehyde resin are disclosed and claimed in the copending application of Alexander Coutras, Serial No. 665,137, now abandoned, filed concurrently herewith; and such compositions are useful in practicing the present invention.

Prior to use a catalyst, e.g., phthalic anhydride, paratoluenesulfonic acid, benzoic acid, salicylic acid, or other curing catalyst, advantageously is added to the blend or solution thereof so as to catalyze the cure of the resin. The catalyst advantageously may be added while the resins are being dissolved in the solvent. The amount of catalyst may be varied as desired or as conditions may require but ordinarily is within the range of from about 0.1% to 1% or 2%, or in some cases even as much as 3% or 4%, based on the amount of resin solids in the solution. The minimum amount of catalyst required to give the desired cure rate should be employed, and this is generally a matter of considerable importance where good electrical properties are wanted in the finished structure. Of course, the use of higher percentages of catalyst than that which has been specified hereinbefore is not precluded.

It may not be necessary to add any curing catalyst (acidic or potentially acidic body) to the composition if the benzoguanimine-formaldehyde resin was dried or finished off at a sufficiently low pH.

Although resinous compositions comprising a blend of an alkyd resin and a reaction product of formaldehyde and formoguanamine or benzoguanamine were known prior to this invention (see, for example, Moore, U.S. Patent No. 2,218,474), such resinous compositions are not the equivalent of resinous compositions herein involved and cannot be used for those applications for which the blended resinous materials used in this invention are especially designed. It is believed that this fact will be clear from the following brief discussion.

Many aminotriazines and, in particular, melamine when reacted with an aldehyde, specifically formaldehyde, in the absence of an alcohol form resinous compositions which, in blends with an alkyd resin, do not provide a completely transparent surface when applied to a surface sheet material, specifically a print sheet, to form a decorative laminate. The compatibility of aminotriazine-aldehyde resins with alkyd resins may be improved by etherification of the methylol aminotriazine (the methylol derivative being obtained when the aldehyde is formaldehyde), as by reaction of the initial aminotriazine-aldehyde reaction product with an alcohol, e.g., butanol. Etherified aminotriazine-formaldehyde resins are not the equivalent of the resinous compositions used in the present invention and are entirely unsuitable for producing the decorative laminates herein involved. When compositions comprised or composed essentially of etherified (alcohol-reacted) aminotriazine-formaldehyde resins are cured under heat and pressure, the large amount of volatile material that is present therein, and which is liberated during curing of the resin, causes excessive gassing and results in a poor surface finish. These surfaces are not as hard and durable as is required during normal service use of the decorative laminate, and generally craze and crack; furthermore, they frequently have very poor solvent resistance. In marked contrast, the resinous compositions herein involved provide smoothly surfaced laminated articles which have excellent craze, heat and solvent resistance.

*Treatment of pre-impregnated overlay paper*

Conventional equipment can, in general, be used in treating the pre-impregnated overlay paper. It is possible to use a straight single dip and dry process. The dryer may be either radiant or hot-air heated. The typical treating conditions used on a vertical two-zone hot-air dryer are:

| | Overlay |
|---|---|
| Speed, linear ft./min. | 9 |
| Dryer temperature, °F.: | |
| Zone No. 1 | 300 |
| Zone No. 2 | 275 |

The desired characteristics of the impregnated paper are obtained by controlling the resin content and the flow of the overlay paper during the treating operation. The recommended ranges are:

|  | Overlay |
|---|---|
| Resin content, percent | 73–76 |
| Volatile content, percent | 3.8–4.8 |
| Flow, percent | 2–8 |

It is usually satisfactory to determine only the flow and resin content of the overlay, although the volatile content should normally fall within the above range.

The resin content of the treated paper is controlled by the specific gravity of the resin solution. Wiper bars and nip rolls can also be used to adjust the resin content. The volatile content and flow of the treated paper are controlled by the dryer temperature and the treater speed.

*The base member*

The base member is one wherein at least the face surface is of wood and usually is of a decorative nature. Examples are birch, mahogany, walnut, oak, etc., lumber; veneers of the foregoing and other woods adhesively bonded or otherwise united to a core of the same or a different lumber; plywood or other "structural board" having a face surface of wood; and chipboards with a top layer of selected high-grade shavings. The wood-surfaced article can be filled and/or stained, if desired.

Plywood is defined as "a cross banded assembly made of layers of veneer, or veneer in combination with lumber core or plies joined with an adhesive. Two types of plywood are recognized, namely veneer plywood and lumber core plywood." (Reference: "Hardwood Plywood," Commercial Standard CS 35–49, U.S. Department of Commerce.) The thickness and density of veneered plywood depend necessarily upon the thickness of the veneers and the number of plies, which, in turn, are determined by the type of wood and the nature of the application. Generally, veneered plywood consists of from 3 to 9 plies and the thickness varies from 3/16 to 1/2 inch. The density is 60 lbs./cu. ft. or less. Lumber core plywood is commonly manufactured in thicknesses of 1/2 to 2 inches, with a density equal to that of the wood itself, viz., 60 lbs./cu. ft. or less.

*Laminating technique*

The impregnated overlay paper is laminated to the core material comprising a decorative wood surface under suitable conditions of time, temperature and pressure. The laminating pressure should not be so high as to damage the wood. With the harder wood-surfaced base members pressures up to 300 p.s.i or a little higher (in some cases) can be used. The pressure employed is generally about 120–300 p.s.i The laminating temperature is generally about 270°–350° F., preferably from about 300° to 330° F., and the time the assembly is in the press to cure the resin is generally at least about 10 minutes, and usually about 15 minutes.

A typical assembly consists of the overlay sheet over the base of decorative wood or wood surface, or of decorative wood veneer backed with, for example, lumber or any of the various structural boards. If balancing is required to produce a flat panel, one or more sheets of high-resin content (e.g., phenolic) treated kraft paper are placed against the reverse side of the panel.

The assembly is placed between metal press plates referred to as cauls, or simply, plates. The plate next to the overlay is a special type of stainless steel chosen for its low thermal coefficient of expansion. The plate finish may vary from a high-gloss, mirrored surface to a sand paper stroke "No. 4" finish depending upon the laminate surface desired. For special applications, etched plates may be used to emboss the laminate surface.

Chipboard or unsaturated kraft paper advantageously is placed on each side of the caul plate assembly, and the entire package sandwiched between heavy steel plates called pull-plates or "irons." The chipboard acts as a cushion to minimize pressure and temperature differences and also to protect the cauls.

The entire assembly is placed into a laminating press and given an appropriate cure cycle. The press consists of thick metal plates or platens which contain tubes through a heating and cooling medium may pass. The holes are of such diameter and position to give uniform heat transfer to the laminate assembly. This is an important factor for satisfactory results.

For "cold discharge" work the pack is loaded into a cold press. Pressure is applied, e.g., 150 to 250 p.s.i., and steam or other heating media are circulated through the platens. By controlling steam pressure, a curing temperature of, for example, 300° F. (or other temperature within the range mentioned above) is attained and held for a predetermined length of time. Then, a cooling medium, usually water, is circulated through the same tubes to return the pack to below 100° F., after which the pressure is released. This completes the press cycle.

In "hot cycle" work the pack is loaded and removed from the press which is maintained at all times at curing temperature. The plates are made an integral part of the press by fastening to the platens with approximately 0.120 inch of cushion stock between the two. Only the laminate assembly is placed in the press and subjected to pressure for the predetermined cure time. After curing, it is pulled from the press hot.

In order that those skilled in the art may better understand how the present invention can be carried into effect, the following examples are given by way of illustration and not by way of limitation. All parts and percentages are by weight unless otherwise stated.

*Example 1.*—A benzoguanamine-formaldehyde resin is prepared as follows:

|  | Parts | Approx. Molar Ratio |
|---|---|---|
| Benzoguanamine | 644 | 1 |
| Aqueous formaldehyde (approx. 37% HCHO) | 558 | 2 |
| Aqueous sodium hydroxide (5 N) | 0.1 |  |

The benzoguanamine and formaldehyde are charged to a suitable reaction vessel equipped with means for reflux. The slurry pH is 6.4. The reaction mixture is heated to reflux in 30 minutes and held at reflux, 94° C., for 60 minutes. The pH at reflux is 7.7. After 60 minutes, the solution becomes turbid and hydrophobic. The sodium hydroxide is then added to adjust the pH of the mixture to 9.3, and the temperature is lowered to 70° C. The reaction mass is then vacuum-concentrated at 23 cm. Hg pressure until the batch temperature reaches 120° C. where it is held until a 50% solution of a sample of the resin in ethanol is stable at 20°–25° C. for more than 5 hours; but the reaction is not allowed to proceed beyond the point where the condensation product has a plasticity of about 60 mils as determined by the previously described Cyanamid test method. This end-point is generally reached after the batch has been held under vacuum at 120° C. for about 10 minutes. The resin is then poured onto trays and cooled to obtain a clear, dry, brittle resin which is ground to between about 60 mesh and 200 mesh fineness. The resin is infinitely dilutable in benzene-denatured anhydrous ethanol.

An impregnating solution (laminating composition) suitable for treating overlay paper is prepared as follows:

| | Parts | |
|---|---|---|
| | Total | Solids Basis |
| Benzoguanamine-formaldehyde resin (as prepared above) | 46.7 | 46.7 |
| Ethylene glycol monoethyl ether solution of lauric acid-modified glyceryl phthalate alkyd resin (60% resin solids, and the alkyd resin being a reaction product of approximately 45% phthalic anhydride, 25% glycerol, and 30% crude lauric acid) | 13.8 | 8.3 |
| Benzene-denatured, anhydrous ethanol | 39.5 | 0 |
| Para-toluenesulfonic acid (catalyst) | 0.23 | 0.23 |

The benzoguanamine-formaldehyde resin and the ethylene glycol monoethyl ether solution of the alkyd resin are dissolved in the ethanol solvent. The acid catalyst is added in ethanol solution with high speed agitation. The resulting treating solution has a pH of about 5.0.

*Overlay paper treatment*

A suitable resin pre-impregnated overlay paper of the kind broadly described hereinbefore is employed. More particularly, the overlay paper is alpha-cellulose overlay paper pre-impregnated with an impregnant comprising about 5% of a homopolymeric diallyl ester, specifically diallyl phthalate, and about 15% of a non-ionic wetting agent, specifically a condensation product of tert.-octyl phenol with about 10 moles of ethylene oxide, these percentages being based on the weight of the dry, pre-impregnated (initially impregnated) paper; that is, on the weight of the dry paper plus impregnant in dry state.

The dry, pre-impregnated paper is dipped in the treating syrup, prepared as described above, and passed through a laboratory infrared treater at a speed of about 1.5 feet per minute. The heat output of the treater is controlled to give the following characteristics in the treated paper:

| | Percent |
|---|---|
| Resin content | 73 |
| Volatile content | 4 |
| Flow | 5 |

The resin content of the finally impregnated paper is determined by the following formula:

$$\frac{100 \times (\text{wt. finally impregnated paper} - \text{wt. bone-dry pre-impregnated paper})}{\text{Wt. finally impregnated paper}}$$
$$= \text{resin content in percent}$$

The bone-dry pre-impregnated paper weight is obtained by drying a sheet of a known area at 160° C. for 5 minutes. Normally, a 4-inch square or disc is cut with a die to obtain uniform test pieces.

The volatile content of the finally impregnated paper is determined as follows:

$$\frac{100 \times (\text{wt. treated sample before drying} - \text{wt. after drying})}{\text{Wt. before drying}}$$
$$= \text{volatile content in percent}$$

The drying is done at 160° C. for 5 minutes. The treated sample is a 4-inch square or disc, as above.

The percent flow of the treated overlay paper is determined as follows:

(1) Cut eight (8) 4″ x 4″ samples of treated paper. Form a neat stack of these samples and staple together.
(2) Weigh accurately to three decimal places.
(3) Place the 8-ply laminate between two sheets of cellophane.
(4) Charge to a hot press (300° F.) and press at 250 p.s.i. for 5 minutes.
(5) Remove cellophane and resin flash from edges.
(6) Reweigh and calculate percent flow by the following formula:

$$\text{Percent flow} = \frac{\text{original wt. (2)} - \text{final wt. (6)}}{\text{Original wt.}} \times 100$$

*Surfacing structural board*

The structural board which is surfaced with an overlay sheet in this example is a sheet of ¾-inch flakeboard. Flakeboard is a type of composition board made by a compression-molding process. The surfaces of this type of board are generally very similar, whereas the center or core of the board may vary considerably, depending on the particular manufacturer of the board. The surface is made up of a layer of wood chips, about ½ inch in diameter, that have been prepared to very precise specifications, especially as to thickness. The chips are bonded together with a resin under heat and pressure to form products with an attractive, smooth and uniform surface.

A sheet of ¾-inch flakeboard is surfaced in the following manner between so-called No. 4 finished, stainless steel press plates or cauls. The plates are first thoroughly cleaned with alcohol and wiped free of dust and fingerprints. A suitable lubricant, such as a synthetic wax, is spread on the plate and then wiped with a clean, dry, lintless cloth until only a faint wax film remains. The plates are then preheated to 150° C. in a conventional laminating press. The overlay sheet is laid on top of the flakeboard and the assembly is placed between the hot cauls. A pressure of 250 p.s.i. (pounds per square inch) is applied and maintained for 15 minutes. The pressure is then released and the laminate is removed hot.

The following properties are obtained:

| | |
|---|---|
| Appearance | Satin finish, excellent transparency; no cracks; unwarped. |
| High temperature resistance (NEMA LP 2-1.08) | Satisfactorily passes test specification. |
| Craze-resistance to heat (16 hr. exposure at 105° C.) | Do. |
| Boiling water resistance (NEMA LP 2-1.07) | Do. |
| Stain resistance (NEMA LP 2-1.10) | Do. |
| Water | Satisfactorily passes test specification; (no water spots). |
| 2B alcohol | Satisfactorily passes test specification. |
| 5% NaOH | Do. |
| 1% NaOH | Do. |
| 10% citric acid | Do. |
| 5% NH₄OH | Do. |
| 5% Na₃PO₄ | Do. |
| 2.5% Tide solution | Do. |
| Acetone | Do. |
| Washable ink | Do. |
| Wear resistance (NEMA LP 2-1.03) | 400-550. |
| Cold check resistance (ASTM D756-50, No. 5) | Satisfactorily passes test specification. |
| Cigarette burn resistance (NEMA LP 2-1.09) | >600 secs. |
| Light color fastness (ASTM D620-45T) | Very slight visible change. |

*Example 2.*—A benzoguanamine-formaldehyde resin is prepared as in Example 1 up to the vacuum-dehydration step. The pressure is reduced to 23 cm. Hg and the batch is concentrated until the temperature reaches 100° C. The batch is held under these conditions to the end-point, as determined by the so-called "blue tail" test that previously was described. Usually the end-point is reached after the batch has been held under vacuum at 100° C. for about 20 minutes.

The apparatus is now set for refluxing and 720 parts of benzene-denatured ethanol is added slowly, while allowing the batch to cool. The temperature is adjusted to 70° C. and 250 parts of the alkyd-resin solution described in Example 1 is added. The batch is then cooled to room temperature. The properties are essentially the same as those of the treating solution of Example 1.

Resin-treated overlay paper is prepared from the above syrup as described under Example 1. A ¾-inch core with with a face veneer of wood, specifically birch, is surfaced as follows:

The overlay sheet is laid on the veneer-faced core panel and the assembly is placed between mirror chrome-finish, stainless steel press plates that have been properly lubricated. The entire assembly is placed in a conventional laminating press at room temperature, and a pressure of 250 p.s.i. is applied and maintained throughout the operation. The temperature is raised to 150° C. and held for 15 minutes. The laminate is then cooled under pressure to room temperature. The surface properties obtained are the same as those of the laminate of Example 1 with the following exception:

Appearance: Very high, excellent gloss; no cracks; unwarped; excellent transparency.

*Example 3.*—Exactly the same materials and procedures are employed as in Example 2 with the exception that the overlay paper is one which has not been pre-impregnated with an impregnant comprising a thermosetting resin; that is, the overlay paper is untreated prior to impregnation with the alkyd resin-modified benzoguanamine-formaldehyde resin.

The resulting laminate shows water-spotting tendencies and is materially less transparent, upon visual observation, than the laminate produced as described under Example 2, which comparison likewise is true with respect to the laminate of Example 1. In other respects, the surface properties of the laminates of Examples 1, 2 and 3 are essentially the same.

*Example 4.*—Resin-treated overlay paper is produced as described in Example 1 using the resinous syrup of Example 2. The assembly is prepared for laminating as follows:

(1) A phenolic resin-treated, kraft, adhesive sheet (produced and sold under the trade name of "Tego" paper by Rohm and Haas Company, Philadelphia, Pa.) is placed on top of a ¾-inch composition board core.

(2) A crossband ply is placed on top of the core, followed by another adhesive sheet. (Liquid adhesives, such as fortified urea-resin glues, can be used in place of the adhesive sheets.)

(3) A maple veneer is placed on top of the adhesive sheet.

(4) The resin-treated overlay is placed on top of the veneer.

(5) If desired, a phenolic resin-treated kraft paper can be used as a backing sheet to balance the assembly.

The whole assembly is then laminated as described in Example 1. The surface properties of the resulting laminate are the same as those of the laminate of Example 1.

*Example 5.*—Resin-treated overlay paper is prepared as described in Example 1. The overlay sheet is then placed on a ⅟₂₈-inch mahogany veneer. A backing sheet of phenolic resin-treated kraft paper, or its obvious equivalent, is used if the assembly has to be balanced. The laminating operation is then carried out as described in either of Examples 1 or 2. After removing from the press a coating of fortified urea-resin glue, or its obvious equivalent, is applied to the back of the laminate. The laminate is next placed on top of a ¾-inch plywood core. This assembly is then charged to a hot press and cured for 10 minutes at 250 p.s.i. and 240° F. The finally surfaced product is then allowed to cool.

Other core materials such as composition board and lumber cores can be used. Other types of liquid glues such as phenolic resins and polyvinyl acetate emulsions have been used successfully. The gluing operation can be carried out at contact pressure and room temperature or in a press at elevated temperatures and pressures depending on the type of adhesive being used. The final laminate has the surface properties described in Example 1.

Other examples of liquid compositions (laminating syrups) that can be used in treating the resin-preimpregnated overlay paper in carrying the present invention into effect are shown below:

|  | Percent | |
| --- | --- | --- |
| Benzoguanamine-formaldehyde resin as in Example 1 | 38.5 | 46.7 |
| Alkyd resin as in Example 1 (solids basis) | 16.5 | 8.3 |
| 2B alcohol (benzene-denatured ethyl alcohol) | 31.5 | 22.5 |
| Ethylene glycol monoethyl ether | 13.5 | 22.5 |

The laminated articles of this invention comprise new products wherein a high quality finish is obtained at a relatively low cost. The finish provides outstanding durability for flat or working surfaces of furniture, e.g., tops of dining tables, occasional tables, dressers, night tables, etc.; for flush-door panels, wall panels and cabinets. The overlay can be applied over stained surfaces, and special grain effects in the surface can be obtained by controlled filling.

I claim:
1. An article of manufacture which includes a base member wherein at least the face surface is of wood, said base member having a thickness of at least ⅟₁₆ inch and the said thickness being correlated with the density of the said base member whereby the latter is adapted to retain its normal form under moderate stress; and a transparent, resin-impregnated overlay sheet of paper laminated to the said base member, said paper having been pre-impregnated with an impregnant comprising (1) from 2% to about 15%, by weight of the dry impregnated paper, of diallyl phthalate, and the pre-impregnated paper in dry state and containing the diallyl phthalate in polymeric state thereafter being impregnated with (2) a curable resinous composition comprising a compatible blend of (A) an uncured resinous product of reaction of ingredients consisting essentially of formaldehyde and benzoguanamine in a molar ratio of from about 1:1 to about 4:1, said ingredients being caused to react until a condensation product is formed, a 50% solution of which in ethyl alcohol is stable at 20°–25° C. for at least 5 hours, but the reaction not being allowed to proceed beyond the point where the condensation product has a plasticity of about 60 mils as determined by the Cyanamid test method, and (B) from about 10% to about 50%, based on the total weight of (A) and (B), of an alkyd resin which is compatible with the resin of (A), the polymeric diallyl phthalate of (1) improving the transparency and resistance to water-spotting of the overlay sheet in the finished article, the resinous materials of (1) and (2) being in cured state in the finished article and, in such state, the resinous composition of (2) constituting at least about 65% by weight of the dry overlay paper in its finally treated form.

2. An article of manufacture as in claim 1 wherein the impregnant used in pre-impregnating the overlay paper includes both diallyl phthalate and a non-ionic wetting agent.

3. An article of manufacture as in claim 2 wherein the non-ionic wetting agent is a condensation product of tert.-octyl phenol with about 10 moles of ethylene oxide.

4. A laminated product comprising a base member having a decorative face veneer of natural wood united thereto, said base member having a thickness of at least ⅟₁₆ inch and the said thickness being correlated with the density of the said base member whereby the latter is adapted to retain its normal form under moderate stress; and a transparent, resin-impregnated overlay sheet of paper laminated to the said veneered base member, said paper having been pre-impregnated with an impregnant comprising (1) from 2% to about 15%, by weight of the dry impregnated paper, of diallyl phthalate, and the pre-impregnated paper in dry state and containing the diallyl phthalate in polymeric state thereafter being impregnated with (2) a curable resinous composition comprising a compatible blend of (A) an uncured resinous product of reaction of ingredients consisting essentially of formaldehyde and benzoguanamine in a molar ratio of from about 1.5:1 to about 2.5:1 at a pH of from about 4 to about 9 and at a temperature of from about 60° to about 200° C., the reaction between the said ingredients being continued until a small amount of a finely ground sample of the resin in solid state produces a definite blue haze at 25° C. in about 10–15 ml. of a 50–50 mixture, by weight, of ethanol and water, and (B) from about 10% to about 20%, based on the total weight of (A) and (B), of an oil-modified alkyd resin which is compatible with the resin of (A), the polymeric diallyl phthalate of (1) improving the transparency and resistance of water-spotting of the overlay sheet in the finished laminated product, the resinous materials of (1) and (2) being in cured state in the finished product and, in such state, the resinous composition of (2) constituting at least about 65% by weight of the dry overlay paper in its finally treated form.

5. The process of making a laminated article which comprises bonding directly to a base member, by the application of heat and pressure, a resin-impregnated overlay sheet of paper, said base member having a thickness of at least 1/16 inch and at least its face surface being of wood, the said thickness being correlated with the density of the said base member whereby the latter is adapted to retain its normal form under moderate stress, said paper having been pre-impregnated with an impregnant comprising (1) from 2% to about 15%, by weight of the dry impregnated paper, of diallyl phthalate, and the pre-impregnated paper in dry state thereafter being impregnated with (2) a curable resinous composition comprising a compatible blend of (A) an uncured resinous product of reaction of ingredients consisting essentially of formaldehyde and benzoguanamine in a molar ratio of from about 1:1 to about 4:1, said ingredients being caused to react until a condensation product is formed, a 50% solution of which in ethyl alcohol is stable at 20°–25° C. for at least 5 hours, but the reaction not being allowed to proceed beyond the point where the condensation product has a plasticity of about 60 mils as determined by the Cyanamid test method, and (B) from about 10% to about 50%, based on the total weight of (A) and (B), of an alkyd resin which is compatible with the resin of (A), the polymeric diallyl phthalate of (1) improving the transparency and resistance to water-spotting of the overlay sheet in the finished article, the resinous materials of (1) and (2) being in cured state in the finished article and, in such state, the resinous composition of (2) constituting at least about 65% by weight of the dry overlay paper in its finally treated form.

6. A process of producing a laminated product which comprises assembling together (1) a base member having bonded directly thereto a decorative face veneer of natural wood, said base member having a thickness of at least 1/16 inch and the said thickness being correlated with the density of the said base member whereby the latter is adapted to retain its normal form under moderate stress and (2) a resin-impregnated overlay sheet of paper in contact with the said veneered base member, said paper having been pre-impregnated with an impregnant comprising (A) from 2% to about 15%, by weight of the dry impregnated paper, of diallyl phthalate, and the pre-impregnated paper in dry state and containing the diallyl phthalate in polymeric state thereafter being impregnated with (B) a curable resinous composition comprising a compatible blend of (a) an uncured resinous product of reaction of ingredients consisting essentially of formaldehyde and benzoguanamine in a molar ratio of from about 1.5:1 to about 2.5:1 at a pH of from about 4 to about 9 and at a temperature of from about 60° to about 200° C., the reaction between the said ingredients being continued until a small amount of a finely ground sample of the resin in solid state produces a definite blue haze at 25° C. in about 10–15 ml. of a 50–50 mixture, by weight, of ethanol and water, and (b) from about 10% to about 20%, based on the total weight of (a) and (b), of an oil-modified alkyd resin which is compatible with the resin of (a), the polymeric diallyl phthalate of (A) improving the transparency and resistance to water-spotting of the overlay sheet in the finished laminated product, the resinous materials of (A) and (B) being in cured state in the finished product and, in such state, the resinous composition of (B) constituting at least about 65% by weight of the dry overlay paper in its finally treated form; and consolidating the resulting assembly under heat and a pressure not exceeding about 300 pounds per square inch thereby to bond the said overlay sheet directly to the said veneered base member.

7. A process of producing a laminated product which comprises assembling together (1) a base member having a thickness of at least 1/16 inch and the said thickness being correlated with the density of the said base member whereby the latter is adapted to retain its normal form under moderate stress, (2) a crossband ply coated on both sides with a thermosetting adhesive in contact with the said base member, (3) a decorative face veneer of natural wood in contact with the said crossband ply, and (4) a resin-impregnated overlay sheet of paper in contact with the said decorative face veneer, said paper having been pre-impregnated with an impregnant comprising (A) from 2% to about 15%, by weight of the dry impregnated paper, of diallyl phthalate, said pre-impregnated paper in dry state and containing the diallyl phthalate in polymeric state thereafter being impregnated with (B) a curable resinous composition comprising a compatible blend of (a) an uncured resinous product of reaction of ingredients consisting essentially of formaldehyde and benzoguanamine in a mollar ratio of from about 1.5:1 to about 2.5:1 at a pH of from about 4 to about 9 and at a temperature of from about 60° to about 200° C., the reaction between the said ingredients being continued until a small amount of a finely ground sample of the resin in solid state produces a definite blue haze at 25° C. in about 10–15 ml. of a 50–50 mixture, by weight, of ethanol and water, and (b) from about 10% to about 20%, based on the total weight of (a) and (b), of an oil-modified alkyd resin which is compatible with the resin of (a), the polymeric diallyl phthalate of (A) improving the transparency and resistance to water-spotting of the overlay sheet in the finished laminated product, the resinous materials of (A) and (B) being in cured state in the finished article and, in such state, the resinous composition of (B) constituting at least about 65% by weight of the dry overlay paper in its finally treated form; and consolidating the resulting assembly under heat and a pressure not exceeding about 300 pounds per square inch.

8. The process of making a laminated article which comprises bonding directly to a base member, by the application of heat and pressure, a resin-impregnated overlay sheet of paper, said base member having a thickness of at least 1/16 inch and at least its face surface being of wood, the said thickness being correlated with the density of the said base member whereby the latter is adapted to retain its normal form under moderate stress, said paper having been pre-impregnated with an impregnant comprising (1) from 2% to about 25%, by weight of the dry impregnated paper, of a non-ionic wetting agent and from 2% to about 15%, by weight of the dry impregnated paper, of diallyl phthalate said pre-impregnated paper in dry state and containing the diallyl phthalate in polymeric state thereafter being impregnated with (2) a curable resinous composition comprising a compatible blend of (A) an uncured resinous product of reaction of ingredients consisting essentially of formaldehyde and benzoguanamine in a molar ratio of from about 1:1 to about 4:1, said ingredients being caused to react until a condensation product is formed, a 50% solution of which in ethyl alcohol is stable at 20°–25° C. for at least 5 hours, but the reaction not being allowed to proceed beyond the point where the condensation product has a plasticity of about 60 mils as determined by the Cyanamid test method, and (B) from about 10% to about 50%, based on the total weight of (A) and (B), of an oil-modified alkyd resin which is compatible with the resin of (A), the polymeric diallyl phthalate of (1) improving the transparency and resistance to water-spotting of the overlay sheet in the finished article, the resinous materials of (1) and (2) being in cured state in the finished article and, in such state, the resinous composition of (2) constituting at least about 65% by weight of the dry overlay paper in its finally treated form.

References Cited in the file of this patent

UNITED STATES PATENTS

| | | |
|---|---|---|
| 2,271,744 | Nevin | Feb. 3, 1942 |
| 2,339,058 | D'Alelio | Jan. 11, 1944 |
| 2,479,090 | Wohnsiedler | Aug. 16, 1949 |
| 2,486,235 | Watt | Oct. 25, 1949 |
| 2,496,097 | Kropa | Jan. 31, 1950 |
| 2,579,980 | Spencer | Dec. 25, 1951 |
| 2,632,744 | Howald | Mar. 24, 1953 |
| 2,642,409 | Cordier | June 16, 1953 |

UNITED STATES PATENT OFFICE
CERTIFICATE OF CORRECTION

Patent No. 2,977,272                        March 28, 1961

Lewis C. Pounds

It is hereby certified that error appears in the above numbered patent requiring correction and that the said Letters Patent should read as corrected below.

Column 10, line 22, for "benzoguanimine" read -- benzoguanamine --; column 12, line 12, after "through" insert -- which --; column 17, line 31, after "state" insert -- and containing the diallyl phthalate in polymeric state --.

Signed and sealed this 24th day of October 1961.

(SEAL)
Attest:

ERNEST W. SWIDER
Attesting Officer

DAVID L. LADD
Commissioner of Patents
USCOMM-DC